United States Patent [19]

LoStracco

[11] Patent Number: 5,022,602
[45] Date of Patent: Jun. 11, 1991

[54] FIBER DISPENSER

[75] Inventor: Gregory LoStracco, Tucson, Ariz.

[73] Assignee: Hughes Aircraft Company, Los Angeles, Calif.

[21] Appl. No.: 425,768

[22] Filed: Oct. 23, 1989

[51] Int. Cl.⁵ .............. B65H 55/00; B65H 49/02
[52] U.S. Cl. ........................ 242/159; 242/54 R; 242/118.5; 242/128; 242/176
[58] Field of Search .......... 242/159, 172, 176, 128, 242/118.5, 54 R

[56] References Cited

U.S. PATENT DOCUMENTS

| | | | |
|---|---|---|---|
| 1,783,339 | 12/1930 | Mitchell | 242/128 |
| 2,629,566 | 2/1953 | King | 242/128 |
| 2,905,408 | 9/1959 | Frate et al. | 242/118.5 |
| 3,021,092 | 2/1962 | Whearley | 242/128 |
| 3,112,899 | 12/1963 | Hosbein | 242/128 |
| 3,122,113 | 2/1964 | Edwards | 242/128 X |
| 3,645,469 | 2/1972 | Fischer et al. | 242/159 X |
| 3,863,861 | 2/1975 | Bellasio | 242/128 |

*Primary Examiner*—Stanley N. Gilreath
*Attorney, Agent, or Firm*—R. M. Heald; C. D. Brown; W. K. Denson-Low

[57] ABSTRACT

A fiber dispenser 10 which provides a bobbin 12 with an expansion ring 30 mounted on an end thereof. The expansion ring 30 is coaxial with the bobbin 12 and permits the use of a nontapered bobbin for high speed dispensation applications. In a specific embodiment, the invention includes a mechanism for adjusting the diameter of the expansion ring as the fiber is dispensed. A further, more specific embodiment includes a mechanism 42, 44 for adjusting the longitudinal position of the expansion ring 30 as the fiber 21 is wound thereon.

8 Claims, 2 Drawing Sheets

FIBER DISPENSER

BACKGROUND OF THE INVENTION

1. Field of the Invention:

The present invention relates to optical fiber technology. More specifically, the present invention relates to techniques for dispensing fiber from a bobbin.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

Certain applications require high-speed dispensation of fiber from a bobbin. One such application involves the optical guidance of missiles and other craft. In such applications, the fiber is typically dispensed from a tapered bobbin. The taper is typically on the order of two degrees and facilitates high-speed payout while mitigating multiple-turn and multiple-layer dispense. Multiple turn dispense involves the pay-out of multiple turns in the outermost layer due to the use of adhesives. Multiple-layer dispense involves the pay-out of a layer that is in the middle of the fiber cable during the payout of a surface layer. Multiple-layer dispense occurs when the cable that is being paid-out catches a section of cable in the area of an aft layer transition (optical fiber stepback) on the bobbin. Either of these anomalies may cause the cable to become entangled and break.

Unfortunately, there are several shortcomings associated with the use of a tapered bobbin. Firstly, the fiber, wound under tension, has a tendency to move down the tapered bobbin to reach a lower energy state. This necessitates the use of glues and/or other schemes to keep the cable in place. Nonetheless, gross movements of the cable pack have been experienced with tapered bobbins.

Secondly, the design and manufacture of the base layer is critical for tapered bobbins. The base layer is a layer on the surface of the bobbin on which the fiber is wound and is typically a wire having a diameter 2% larger than the cable diameter. The base layer determines the "pitch" of the fiber, that is, the spacing of each turn of the fiber and transmits the fiber pack loads to the bobbin. Tapered bobbins generally require wire base layers which are expensive to manufacture, requiring the wrapping of precision drawn wire around the bobbin.

Thirdly, tapered bobbins are difficult and expensive to manufacture. Each design is a function of such factors as the speed of dispensation, whether the bobbin is moving or stationary, and whether the bobbin is intended for operation in the air or in the water. In addition, the diameter of the bobbin and optical cable diameter impacts on the taper, thus, there is no simple technique for designing the taper of each bobbin.

In addition, the use of a taper requires the winding of the fiber with the layer transitions mentioned above. This precludes the use of certain autowinding techniques and therefore necessitates a relatively slow and costly winding operation. The required transitions also lessen the volumetric efficiency of the bobbin, i.e., lessens the amount of cable that may be wound within a proscribed volume.

As mentioned above, the tapered bobbin requires adhesives. The tapered bobbin also provides limited control of post peel point friction and provides no buffer between the peel point and paid-out fiber at the aft layer transitions.

Thus, there is a need in the art to provide an improved fiber dispenser. More specifically, there is a need in the art to provide a nontapered fiber dispenser.

SUMMARY OF THE INvENTION

The need in the art is addressed by the fiber dispenser of the present invention which provides a bobbin with a ring mounted on an end thereof. The ring is coaxial with the bobbin and permits the use of a nontapered bobbin for high speed dispensation applications.

In a specific embodiment, the invention includes a mechanism for adjusting the diameter of the ring as the fiber is dispensed. A further, more specific embodiment includes a mechanism for adjusting the longitudinal position of the ring as the fiber is being wound thereon in order to allow the elimination of layer transitions.

FIG, 4 shows the fiber dispenser of the present invention with the ring and the advantageous fiber transition from layer-to-layer permitted thereby.

Figure 4:
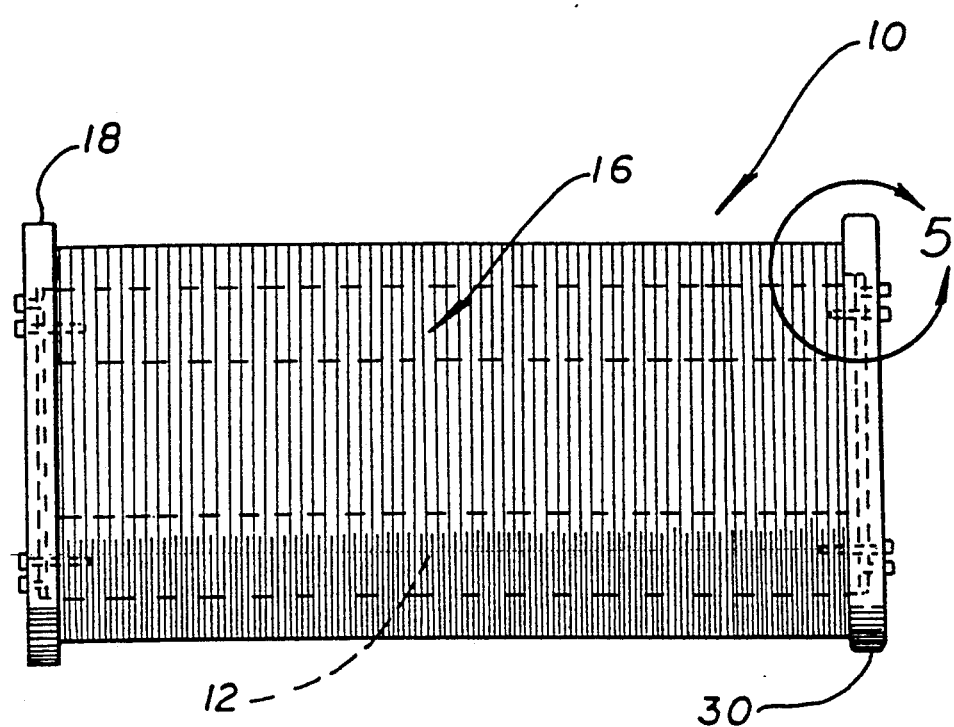
Figure 5:
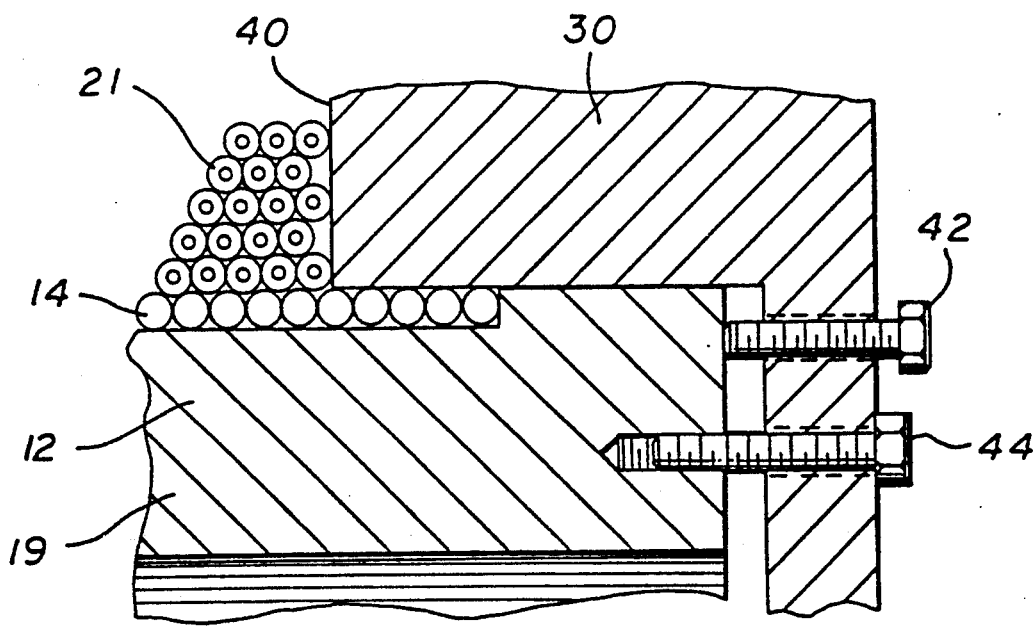

FIG. 5 is a magnified partial sectional view of the fiber dispenser of FIG. 4 showing advantageous the fiber transition from layer-to-layer and the mechanism for adjusting the longitudinal position of the ring.

DESCRIPTION OF THE INVENTION

Illustrative embodiments and exemplary applications will now be described with reference to the accompanying drawings to disclose the advantageous teachings of the present invention.

Figure 1:
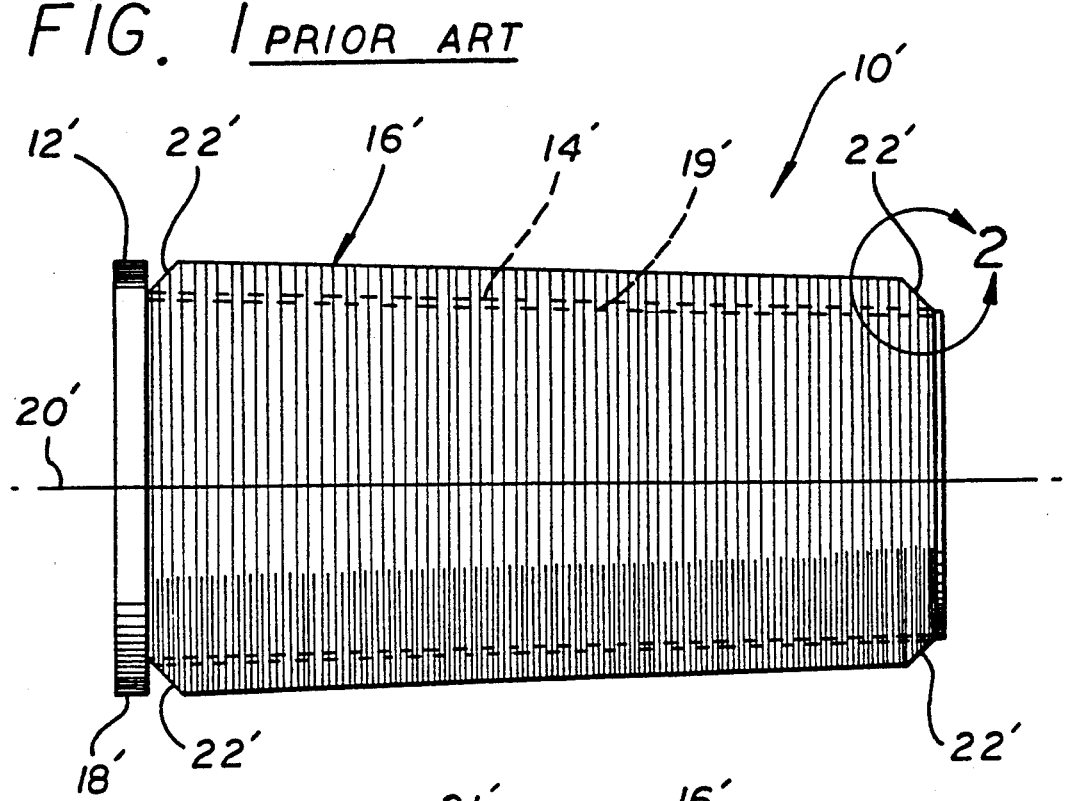
FIG. 1 shows a tapered fiber dispenser of conventional design.

FIG. 1 shows a tapered fiber dispenser 10' of conventional design. The dispenser 10' includes a bobbin 12', a wire base 14' (shown in phantom in FIG. 1) on the bobbin 12' and a cable pack 16' on the wire base 14'. The bobbin 12' has an annular flange 18' mounted at the forward end of a tapered extension 19' (shown in phantom in FIG. 1). The extension 19' is coaxial with the flange 18' and lies along the longitudinal axis 20' of the bobbin 12'. The extension 19' has a taper to facilitate the high speed dispensation of fiber therefrom. The bobbin is typically constructed of aluminum or advanced composite materials.

Figure 2:
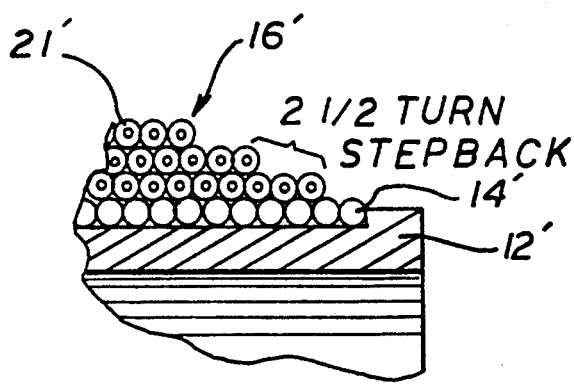
FIG. 2 is a magnified partial sectional view of the tapered fiber dispenser of FIG. 1 showing the fiber transition from layer-to-layer generally employed in the use of such dispensers.

The fiber 21' is wound to form the cable pack 16' with a step back as is common, indeed, generally required, with tapered bobbin type fiber dispensers of conventional design. The step back creates slanted annular end sections 22' on the cable pack 16'. This is shown more clearly in the FIG. 2. FIG. 2 is a magnified partial sectional view of the tapered fiber dispenser 10' of FIG. 1 showing the fiber transition from layer-to-layer generally employed in such dispensers. FIG. 2 shows a two and one-half turn step back. As discussed more fully below, the present invention obviates the requirement for a step back in the cable pack and thereby affords improved volumetric efficiency and pack stability relative to the convention fiber dispenser design 10', and may allow elimination of adhesives.

Figure 3:
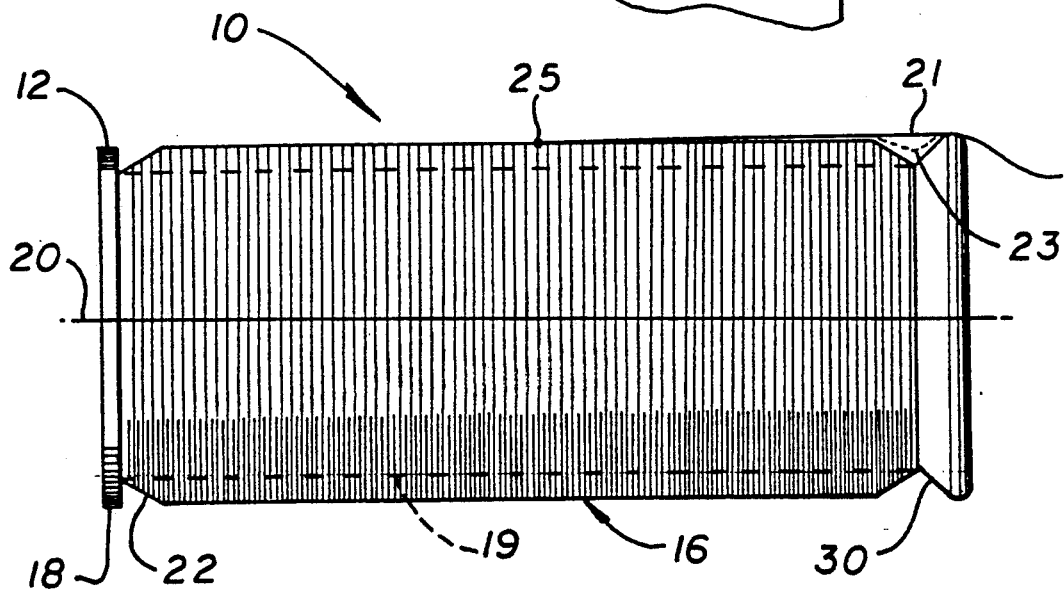
FIG. 3 shows the fiber dispenser of the present invention with a ring and a conventional fiber transition from layer-to-layer.

For illustration, however, FIG. 3 shows the fiber dispenser of the present invention with a ring with the conventional fiber transition from layer-to-layer. The fiber dispenser 10 of the present invention includes a cylindrical bobbin 12, a base layer 14 (not shown) and a cable pack 16. The base layer 14 is of conventional design and construction. With the fiber dispenser 10 of the present invention, the base layer 14 serves only to establish the pitch of the cable pack, that is, the spacing or number of turns per inch. The base layer need not be precisely manufactured to avoid the static problems of conventional fiber dispensers.

The bobbin 12 includes an annular flange 18 having a cylindrical extension 19 therefrom. The extension 19 is coaxial with the flange 18 and lies along the longitudinal axis 20 of the bobbin 10. A ring 30 is bolted to the end of the extension 19. In the illustrative embodiment, the ring 30 is made of cylindrical plate aluminum and has a 63 micro-inch finish. Graphite epoxy composite or other suitable material may be used and the ring may be coated with teflon or plastic without departing from the scope of the invention.

As illustrated in FIG. 3, the ring 30 serves to lift the fiber 21 off the cable pack 16. In high speed fiber pay-out applications, the ring 30 may be heated by the frictional effects of fiber movement over the ring. Thus, circumferential slots (not shown) perpendicular to the dispenser longitudinal axis 20 may be provided in the ring 30 to facilitate the cooling thereof.

As is known in the art, at high speed pay-out, the fiber 21 may suffer negative ballooning effects. The negative ballooning effect is illustrated in dashed line as the fiber 23 is depressed toward the dispenser axis 20 between the ring 30 and the peel point. This causes friction on the ring 30 and increases tension on the fiber. This effect is discussed by Daphne G. Padfield in "The Motion and Tension of an Unwinding Thread" pages 382–407 of Wool Industries Research Association Paper (of England) dated January, 1958. To minimize this effect, the diameter of the ring 30 should be as close to that of the cable pack 16 on the extension 19 as possible. In the preferred embodiment, the ring 30 would have an outside diameter that contracts as the fiber 21 is paid-out. This may be accomplished in any manner. For example, the ring 30 may be constructed of an engineered material (such as soap, wax, graphite with a loose adhesive, or teflon) designed to wear away as the fiber is dispensed in order to maintain a constant difference between the pack and the ring diameters, or the ring 30 may change diameter mechanically, as with an iris.

FIG. 4 shows the fiber dispenser of the present invention with the ring and the advantageous fiber transition from layer-to-layer permitted thereby. For this embodiment, the ring 30 has a planar rear surface to facilitate the retention of fiber in a "zero step back" winding geometry. This is illustrated in FIG. 5.

FIG. 5 is a magnified partial sectional view of the fiber dispenser 10 of FIG. 4 showing the advantageous zero step back fiber transition from layer-to-layer afforded by the present invention. As illustrated, the ring 30 has a planar rear surface 40 which serves to retain the fiber pack 16 in the zero step back configuration. That is, the fiber may be wound with a highly efficient alternating one-half turn positive and negative setback from layer-to-layer using the surface 40 as a retaining element on the distal end and the flange 18 on the proximal end of the bobbin 10. This allows for a high speed autowinding of the fiber 21 on the pack.

Also shown in FIG. 5 is an illustrative mechanism for adjusting the longitudinal position of the ring 30. The mechanism includes two screws 42 and 44. The first screw 42 engages threads in the ring 30 and abuts against the extension 19 of the bobbin 12. The second screw 44 engages threads in the extension 19. Thus, tightening of the first screw 42 moves the ring 30 away from the extension 19 along the longitudinal axis 20 while tightening of the second screw 44 moves the ring toward the extension 19. This movement permits phasing of the ring 30 relative to the base layer. This facilitates the elimination of step back layer transitions.

Thus, the present invention has been described herein with reference to a particular embodiment for a particular application. Those having ordinary skill in the art and access to the present teachings will recognize additional modifications applications and embodiments within the scope thereof. For example, the invention is not limited to a particular winding geometry or a particular construction. Further, the invention is not limited to any particular application.

It is therefore intended by the appended claims to cover any and all such applications, modifications and embodiments within the scope of the present invention.

Accordingly,

What is claimed is:

1. A fiber dispenser comprising:
    a first cylindrical section having a constant diameter along the longitudinal axis thereof;
    a ring mounted on an end of said cylindrical section, said ring being coaxial with said cylindrical section; and
    means for adjusting the diameter of said ring.

2. The invention of claim 1 wherein said means for adjusting the diameter of said ring consists of a material built into said ring which is removed by the fiber as said fiber is being paid-out from said fiber dispenser.

3. The invention of claim 1 including means for adjusting the longitudinal position of said ring.

4. A fiber dispenser comprising:
    a bobbin having a first cylindrical section with a constant diameter along the longitudinal axis thereof;
    a base layer on the surface of said cylindrical section;
    a ring mounted on an end of said cylindrical section, said ring being coaxial with said cylindrical section;
    means for adjusting the diameter of said ring; and
    means for adjusting the longitudinal position of said ring.

5. The invention of claim 4 wherein said means for adjusting the diameter of said ring consists of a material built into said ring which is removed by the fiber as the fiber is dispensed from said fiber dispenser.

6. A method for dispensing fiber from a cylindrical dispenser having a ring on at least one end thereof and a longitudinal axis therethrough along the length thereof, said method including the steps of:
    (a) pulling the fiber in a direction generally parallel to the longitudinal axis of said dispenser and
    (b) adjusting the diameter of said ring as said fiber is dispensed.

7. A method of rapidly dispensing optical fiber endwise from a cable pack formed on a cylindrical bobbin having a longitudinally adjustable ring on at least one end thereof, said method including the steps of:

paying out the optical fiber from said cable pack over said ring in a direction generally parallel to a longitudinal axis extending lengthwise through said bobbin; and, contracting an outside diameter of said ring as said optical fiber pays out from said cable pack to minimize the effect of frictional forces between said optical fiber and said ring.

8. The method of claim 7, including the step of maintaining a substantially constant difference between the outside diameter of the ring and the outside diameter of the cable pack during payout of optical fiber from said bobbin.

* * * * *